United States Patent
Frommenwiler et al.

(10) Patent No.: US 6,698,574 B2
(45) Date of Patent: Mar. 2, 2004

(54) METHOD AND EQUIPMENT FOR THE TRANSFER OF WORKPIECES

(75) Inventors: Franz Frommenwiler, Rothenburg (CH); Bruno Fischer, Oetwil (CH); Markus Klingler, Niederhasli (CH)

(73) Assignee: Komax Holding AG, Dierikon (CH)

( * ) Notice: Subject to any disclaimer, the term of this patent is extended or adjusted under 35 U.S.C. 154(b) by 0 days.

(21) Appl. No.: 10/191,690

(22) Filed: Jul. 9, 2002

(65) Prior Publication Data

US 2003/0014153 A1 Jan. 16, 2003

(30) Foreign Application Priority Data

Jul. 9, 2001 (EP) .............................. 01810677

(51) Int. Cl.[7] .............................................. B65G 29/00
(52) U.S. Cl. .................................. 198/465.1; 198/665.3
(58) Field of Search ............................ 198/465.1, 665.3

(56) References Cited

U.S. PATENT DOCUMENTS

| | | | | |
|---|---|---|---|---|
| 3,075,630 A | * | 1/1963 | Fisk .............................. 198/76 |
| 3,827,545 A | | 8/1974 | Buhayar | |
| 4,461,379 A | * | 7/1984 | Papp .......................... 198/472 |
| 4,552,260 A | * | 11/1985 | Teagno et al. ................ 198/345 |
| 4,668,152 A | | 5/1987 | Gomann et al. ............ 414/403 |
| 4,681,212 A | * | 7/1987 | Miller ....................... 198/803.2 |
| 4,911,284 A | * | 3/1990 | Weihe et al. ............. 198/465.1 |
| 4,934,515 A | * | 6/1990 | Linden ..................... 198/803.2 |
| 5,253,743 A | * | 10/1993 | Haas, Sr. et al. ......... 198/347.1 |
| 5,280,830 A | * | 1/1994 | Schiaretti et al. ......... 198/465.3 |
| 5,346,051 A | * | 9/1994 | Keith ........................ 198/346.1 |
| 5,544,735 A | * | 8/1996 | Gyger ....................... 198/465.3 |
| 5,873,452 A | * | 2/1999 | Nolan ....................... 198/465.3 |
| 5,979,637 A | * | 11/1999 | Iwamoto et al. .......... 198/465.1 |
| 6,170,639 B1 | | 1/2001 | Diederich | |

FOREIGN PATENT DOCUMENTS

DE 25 44 499 A1 4/1977
EP 0 340 639 A1 11/1989

* cited by examiner

*Primary Examiner*—Christopher P. Ellis
*Assistant Examiner*—Rashmi Sharma
(74) *Attorney, Agent, or Firm*—Schweitzer Cornman Gross & Bondell LLP

(57) ABSTRACT

In a production line small parts or conductor ends are transported by workpiece carriers from work station to work station in a production direction. First and second groups of work stations. First and second transfer devices move the workpiece carriers from work station to work station in the groups. An interchange device is connected between the two transfer devices, the first transfer device handing over the workpiece carriers to the interchange device and the interchange device feeding the workpiece carriers to the second transfer device. The interchange device serves as an adapter for different workpiece carrier spacings (pitch dimensions) of the first and second groups. The workpiece carriers are maintained in positive positions upon the transfer devices and the interchange device, each of which is independently driven to allow synchronism to be accomplished when a carrier is transferred to or from the interchange device.

6 Claims, 7 Drawing Sheets

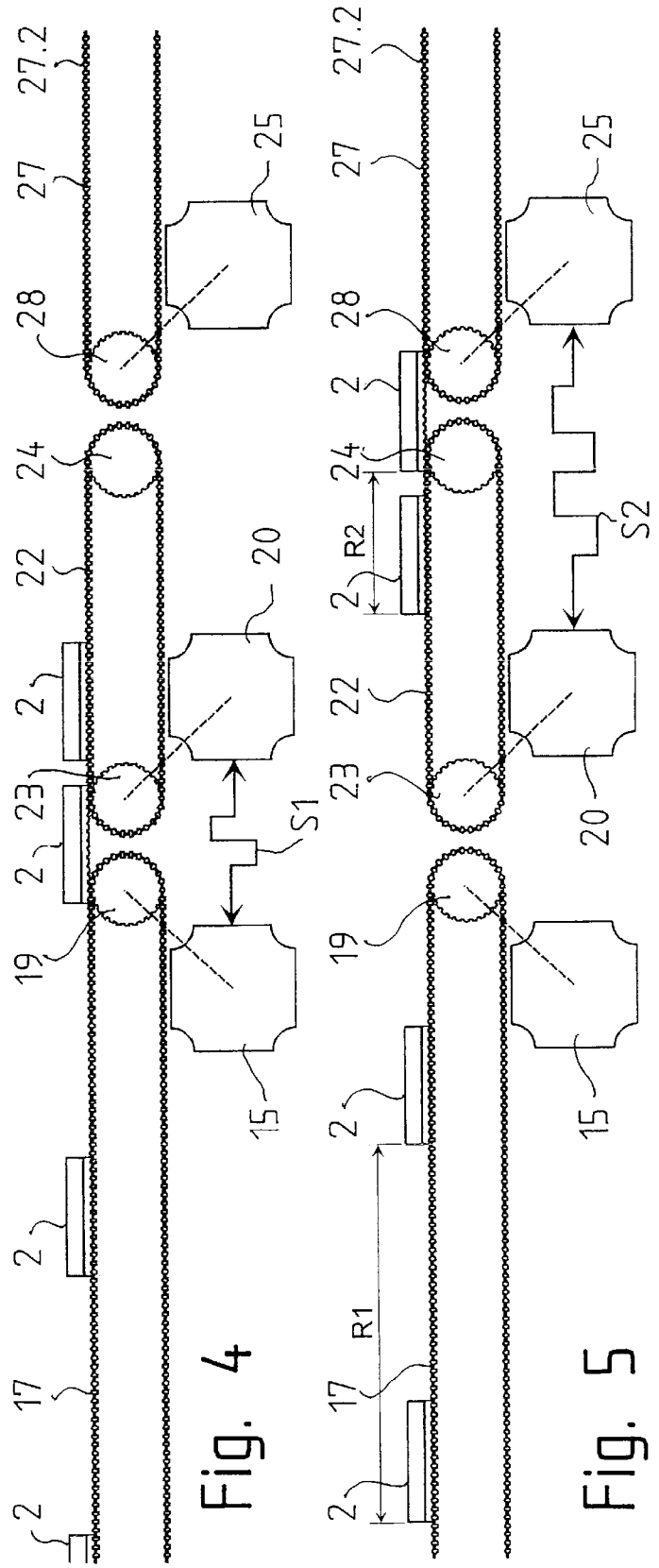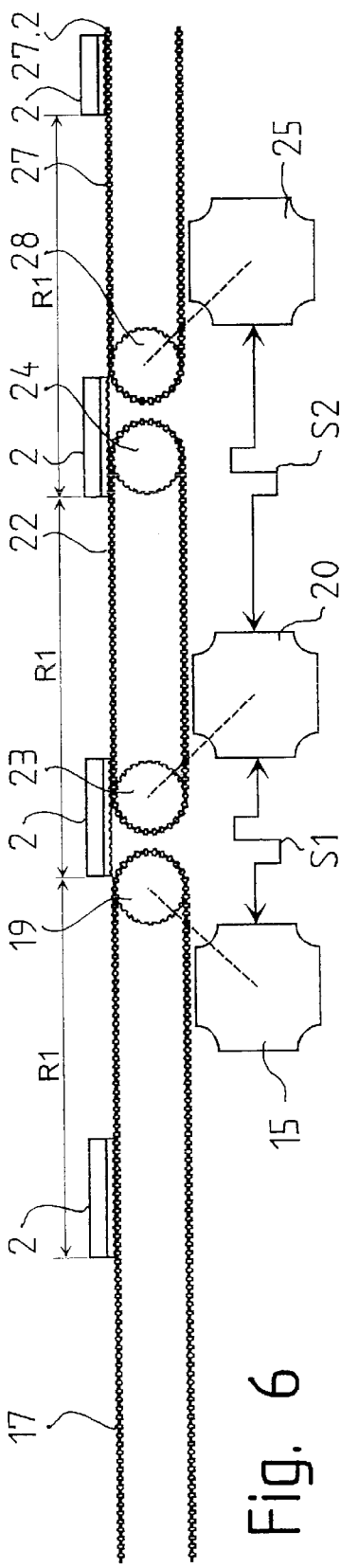

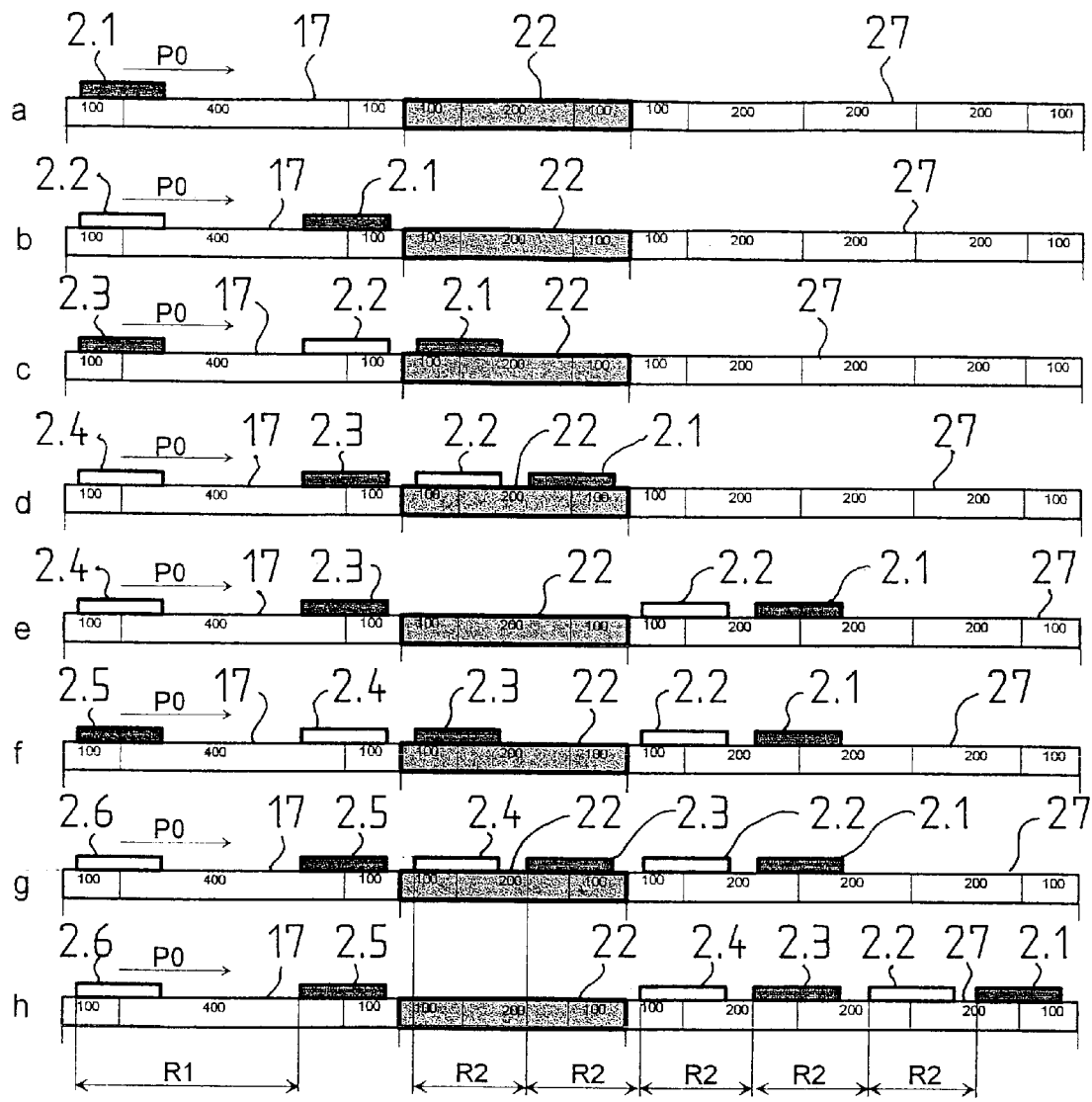

METHOD AND EQUIPMENT FOR THE TRANSFER OF WORKPIECES

The present invention relates to a method and equipment for the transfer of workpieces which are processed in at least one first group of work stations and in at least one second group of work stations of a production line, wherein a first transfer device moves workpiece carriers with the workpieces from work station to work station of the first group, and a second transfer device moves workpiece carriers with the workpieces from work station to work station of the second group and wherein the first transfer device hands over the workpiece carriers to an interchange device and the interchange device feeds the workpiece carriers to the second transfer device.

BACKGROUND OF THE INVENTION

A transfer device in which workpieces are transported by means of workpiece carriers from work station to work station of a production line has become known from laid-open specification DE 198 26 627 A1. The work stations are arranged in a line and provided with assembly devices and/or processing devices. A first group of work stations executes time-intensive work procedures and a second group of work stations executes less time-intensive work procedures, wherein the first group is disposed upstream of the second group production with reference to the direction of workflow. A first transfer device moves the workpiece carriers from work station to work station of the first group. A second transfer device moves the workpiece carriers from work station to work station of the second group. An interchange device is connected between the two transfer devices, wherein the first transfer device hands over the workpiece carriers to the interchange device and the interchange device feeds the workpiece carriers to the second transfer device. The workpiece carriers pass from the first transfer device to a transport belt of the interchange device, wherein the transport belt pre-positions the workpiece carriers in that the workpiece carriers are moved up to a retaining element. At the entry side the second transfer device has a coupling section which, by means of a stroke movement, grips a workpiece carrier at a toothed profile at its base side and passes it on to a belt drive. The stroke movement of the coupling section is derived from a control shaft for the work stations of the second group.

A disadvantage of the known equipment resides in the fact that the onward movement of the workpiece carriers within the interchange device is effected by means of a frictional force between the workpiece carriers and a flat belt. If the frictional force falls below the requisite traction force of the workpiece carrier, the workpiece carrier is left standing in uncontrolled manner. A greater mass of the workpiece carrier can increase the tractive force. Heavier workpiece carriers, however, cause greater wear and require lower transport speeds.

BRIEF DESCRIPTIONS OF THE INVENTION

The present invention, as characterised in claims 1 and 4, meets the object of avoiding the disadvantages of the known equipment and of advancing the workpiece carriers independently of the frictional force between the workpiece carrier and the transport belt. In accordance therewith, the present invention provides independent drives for the transfer devices and the interchange device. The motion of the interchange device can be synchronized with the motion of the transfer devices to maintain proper work flow. Means may be provided on the transfer devices, interchange device, and workpiece holders to insure a positive, non-slip interconnection. In a preferred embodiment each of the transfer devices and the interchange device are independently driven, and incorporate cogged belts which engage complementary-profiled workpiece holders.

The advantages achieved by the invention are essentially to be seen in that the workpiece carriers are transported within the entire production line in a mechanically positively coupled manner. The production line can thereby be optimised in length and the processing plant can thus be constructed to be shorter and requires less space. The interchange device can operate with a smallest possible pitch, or transport workpiece carrier against workpiece carrier, and subsequently pass them over to a transport unit at a different pitch. Moreover, the equipment for the transfer of the workpiece carriers can be constructed substantially more simply in mechanical terms, which in turn has a favourable effect on the production costs of the processing plant. In addition, the equipment manages with few wear parts, which increases reliability and reduces maintenance expenditure.

BRIEF DESCRIPTION OF THE DRAWINGS

The present invention is explained in more detail in the following description with reference to the accompanying figures, in which:

FIGS. 4, 5 and 6 show successive schematic illustrations of the synchronisation of the drive motors during handover of a workpiece carrier from a transfer device to an interchange device or during handover a workpiece carrier from an interchange device to a transfer device;

FIGS. 9a–h show schematic illustrations of the transfer of the workpiece carriers with different spacings and with different time-intensive work procedures within the production line.

DETAILED DESCRIPTION OF THE INVENTION

Figure 1:
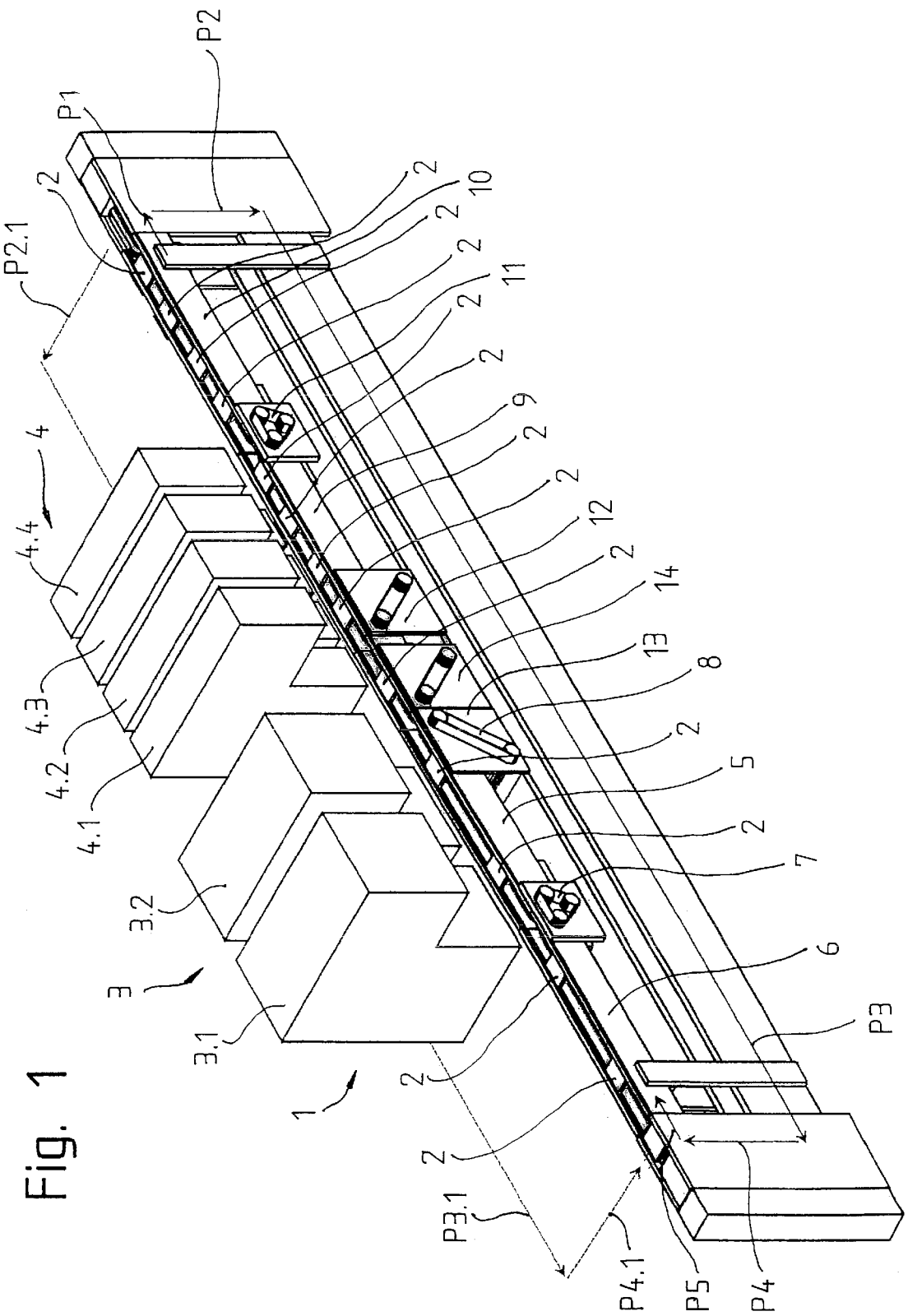
FIG. 1 shows a production line with work stations and equipment for the transfer of workpiece carriers, in accordance with the invention.

FIG. 1 shows a production line for the processing of workpieces, for example small parts or conductor ends, which are transported by means of workpiece carriers 2 from work station to work station. The production direction is symbolized by an arrow P0. The workstations are arranged in a line and provided with assembly devices and/or processing devices, wherein a first work station group 3 with large work stations 3.1, 3.2 and a work station second group 4 with small work stations 4.1, 4.2, 4.3, 4.4 are provided. The first group 3 causes a large spacing between workpiece carriers 2 (large pitch dimension) and the second group 4 causes a small spacing between workpiece carriers 2 (small pitch dimension). In the illustrated embodiment the first group 3 of work stations 3.1, 3.2 executes less time-intensive working procedures than the second group 4 of work stations 4.1, 4.2, 4.3, 4.4. The work procedures of the first group 3 can also be equally time-intensive or more time-intensive than the work procedures of the second group 4.

A first transfer device 5 and a first extension 6 move the workpiece carriers 2 from work station to work station of the first group 3, wherein the first transfer device 5 mechanically drives the first extension 6 by means of a first coupling 7. A first transfer drive 8 drives the first transfer device 5.

A second transfer device 9 and a second extension 10 move the workpiece carriers 2 from work station to work station of the second group 4, wherein the second transfer device 9 mechanically drives the second extension 10 by means of a second coupling 11. A second transfer drive 12 drives the second transfer device 9.

By use of the extensions 6, 10 the belt drives of the transfer devices 5, 9 are not too long and belt elasticity is thus minimized, so as to have a positive effect on the positional accuracy of the workpiece carriers 2.

An interchange device 13 with an interchange drive 14 is connected between the two transfer devices 5, 9, wherein the first transfer device 5 hands over the workpiece carriers to the interchange device 13 and the interchange device 13 feeds the workpiece carriers 2 to the second transfer device 9. The interchange device 13 serves as an adapter for the different pitch dimensions of the first work station group 3 and the second work station group 4. If more than two groups of work stations are provided, more than two transfer devices and more than one interchange device are provided.

The return run of the workpiece carriers 2 is symbolised by arrows P1, P2, P3, P4 and P5, wherein P1, P3 and P5 are, for example, horizontal belt drives and P2, P4 are vertical conveyors for the workpiece carriers 2. As a variant, the return run of the workpiece carriers 2 can take place exclusively in a horizontal plane. This return run variant is symbolized by the arrows P1, P2.1, P3.1, P4.1 and P5.

Figure 2:
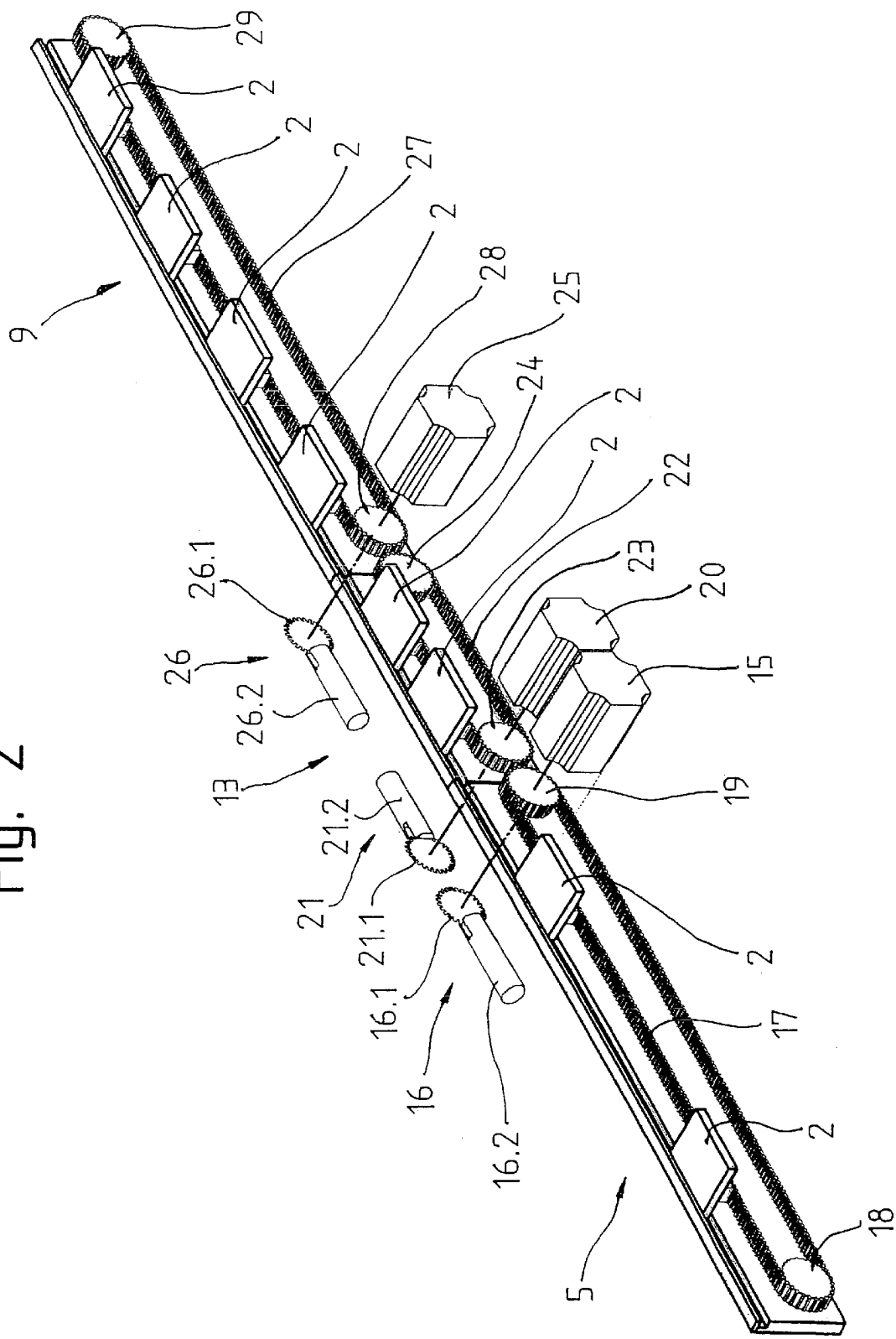
FIG. 2 shows a first transfer device, an interchange device and a second transfer device with the associated drive motors and sensors for detecting the position of the workpiece carriers, as used in the production line of FIG. 1.

FIG. 2 shows the first transfer device 5 with a first drive motor 15, a first sensor 16 and a first double-sided cogged belt 17, which is deflected by means of a first gearwheel 18 and a second gearwheel 19, wherein the first drive motor 15 acts on the second gearwheel 19. The first sensor 16 consists of a first toothed disc 16.1, which images the teeth of the second gearwheel 19, and a first scanner 16.2, which detects the teeth of the rotating first toothed disc 16.1. The first transport device 5 is shown as transporting two workpiece carriers 2.

FIG. 2 also shows the interchange device 13 with a second drive motor 20, a second sensor 21 and a second double-sided cogged belt 22, which is deflected by means of a third gearwheel 23 and a fourth gearwheel 24, wherein the second drive motor 20 acts on the third gearwheel 23. The second sensor 21 consists of a second toothed disc 21.1, which images the teeth of the third gearwheel 23, and a second scanner 21.2, which detects the teeth of the rotating second toothed disc 21.1. The interchange device 13 is shown as transporting two workpiece carriers 2.

FIG. 2 further shows the second transfer device 9 with a third drive motor 25, a third sensor 26 and a third double-sided cogged belt 27, which is deflected by means of a fifth gearwheel 28 and a sixth gearwheel 29, wherein the third drive motor 25 acts on the fifth gearwheel 28. The third sensor 26 consists of a third toothed disc 26.1, which images the teeth of the fifth gearwheel 28, and a third scanner 26.2, which detects the teeth of the rotating third toothed disc 26.1. The second transfer device 9 is shown as transporting four workpiece carriers 2.

Figure 3:
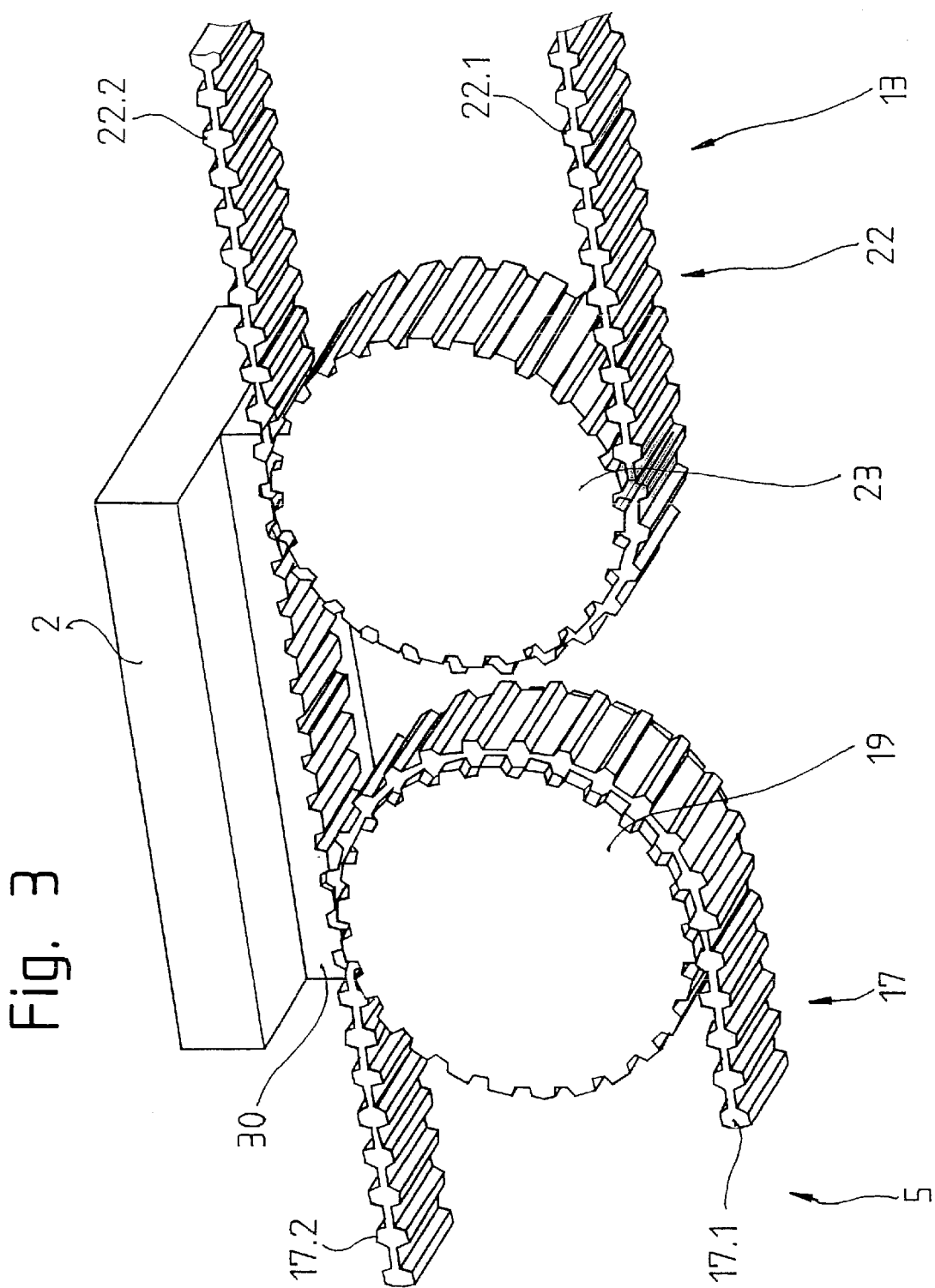
FIG. 3 shows a schematic illustration of a workpiece carrier in the handover from a transfer device to an interchange device or in the handover from an interchange device to a transfer device.

FIG. 3 shows a schematic illustration of a workpiece carrier 2 during a handover from the first transfer device 5 to the interchange device 13 or during a handover from the interchange device 13 to the second transfer device 9. The double-sided first cogged belt 17 of the first transfer device 5 serves as a transport means for the workpiece carriers 2, wherein the teeth 17.1 of one belt side engage the gearwheels 18, 19 and the teeth 17.2 of the other belt side engage a toothed profile 30 arranged at the underside of the workpiece carrier 2. The double-sided second cogged belt 22 of the transfer device 13 similarly serves as a transport means for the workpiece carriers 2, wherein the teeth 22.1 of one belt side engage the gearwheels 23, 24 and the teeth 22.2 of the other belt side engage the toothed profile 30 arranged at the underside of the workpiece carrier 2. The same applies to the handover of the workpiece carrier 2 from the interchange device 13 to the second transfer device 5. The transport of the workpiece carrier 2 in the production direction P0 thus takes place exclusively by the mechanically positive coupling between the cogged belts 17, 22, 27 and the workpiece carrier 2 without mechanical coupling between the first transfer device 5 and the interchange device 13 or between the interchange device 13 and the second transfer device 9.

FIG. 4 shows a schematic illustration of the synchronization of the drive motors 15, 20 during a handover of a workpiece carrier 2 from the first transfer device 5 to the interchange device 13. Workpiece carrier 2 is in engagement with teeth 17.2 of the first cogged belt 17 and with teeth 22.2 of the second cogged belt 22.2. During the handover of the workpiece carrier 2 from the first transfer device 5 to the interchange device 13 the first drive motor 15 and the second drive motor 20 have to run synchronously. The synchronization between the two motors 15, 20 is symbolized by an arrow S1.

FIG. 5 shows a schematic illustration of the synchronization of the drive motors 20, 25 during a handover of a workpiece carrier 2 from the interchange device 13 to the second transfer device 9. Workpiece carrier 2 is in engagement with teeth 22.2 of the second cogged belt 22 and with teeth 27.2 of the third cogged belt 27.2. During the handover of workpiece carrier 2 from the interchange device 13 to the second transfer device 9 the second drive motor 20 and the third drive motor 25 have to run synchronously. The synchronization between the two motors 20, 25 is symbolized by the arrow S2. The pitch dimension R1 of the first transfer device 5 differs from the pitch dimension R2 of the interchange unit 13.

FIG. 6 shows a schematic illustration of the synchronization of all drive motors 15, 20, 25 during a handover of a workpiece carrier 2 from the first transfer device 5 to the interchange unit 13 and during simultaneous handover of a further workpiece carrier 2 from the interchange device 13 to the second transfer device 9. The pitch dimension is uniform and is denoted by R1.

Figure 7:
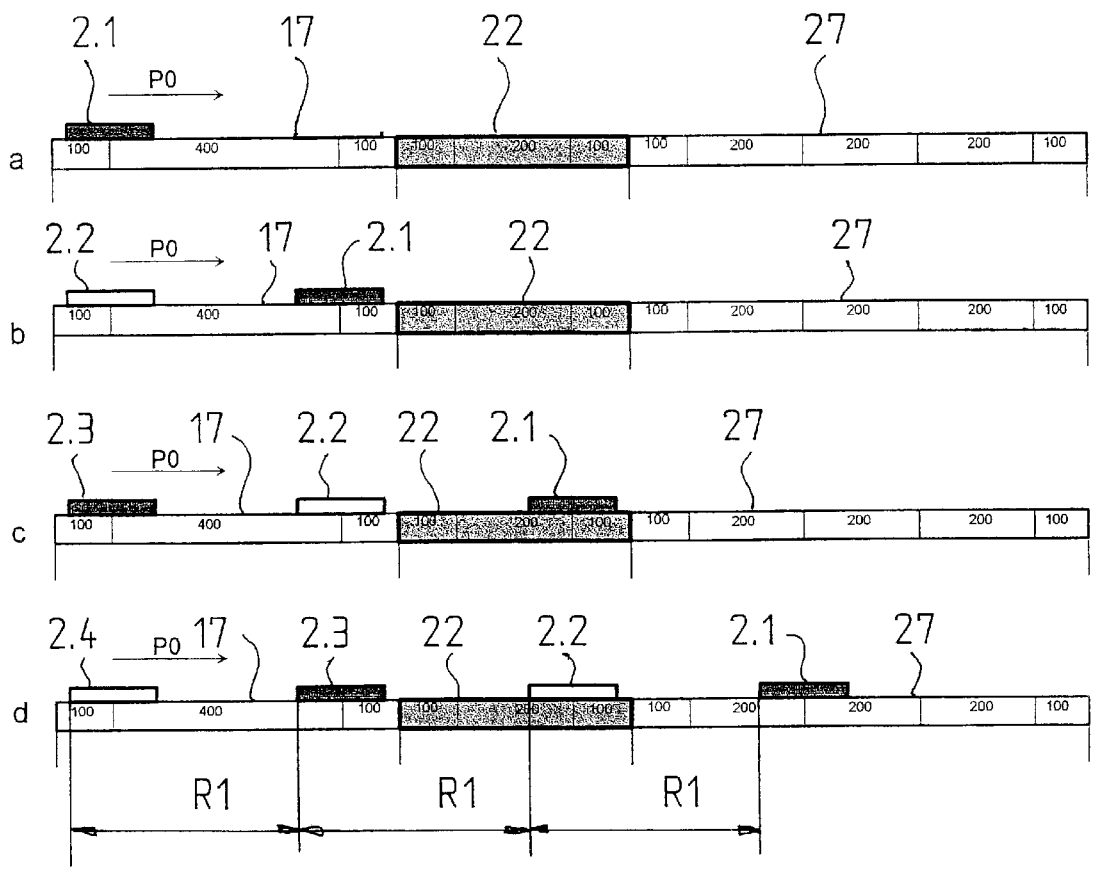
FIGS. 7a–d show successive schematic illustrations of the transfer of the workpiece carriers with the same spacing within the production line.

FIGS. 7a–d show schematic illustrations of the transfer of workpiece carriers 2 at the same spacing within the production line 1. The distance statements refer, by way of example, to millimeters. Workpiece carrier 2.1 stands in engagement with the first cogged belt 17, wherein the workpiece is processed by work station 3.1 (FIG. 7a). After the processing, the first drive motor moves the first cogged belt 17 by 400 mm in production direction P0. The workpiece carrier 2.1 now stands at the position for processing of the workpiece by work station 3.2 and at the same time a further workpiece carrier 2.2 stands at the position for processing by work station 3.1 (FIG. 7b). In the next step (FIG. 7c) the first cogged belt 17 is moved by a further 400 mm and the second cogged belt 22 is moved by means of the second drive motor 20 by 400 mm, wherein the cogged belts 17, 22 are accelerated synchronously at the same speed. The workpiece carrier 2.1 is received by the second cogged belt 22 and is stopped at the shown position. In the step of FIG. 7d the cogged belts 17, 22 are moved by a further 400 mm and the third cogged belt 27 by means of the third drive motor 25 by 400 mm, wherein the cogged belts 17, 22, 27 are accelerated synchronously at the same speed. The workpiece carrier 2.1 is taken over by the third cogged belt 27 and stopped at the shown position, at which position work station 4.2 processes the workpiece of workpiece carrier 2.1. The positions of the further workpiece carriers 2.2, 2.3, 2.4 have also been changed in an analogous manner. The mode of transfer shown in FIG. 7 is provided for work stations of the first group 3 and the second group 4 with equal pitch dimension R1 and equal time-intensive work procedures.

Figure 8:
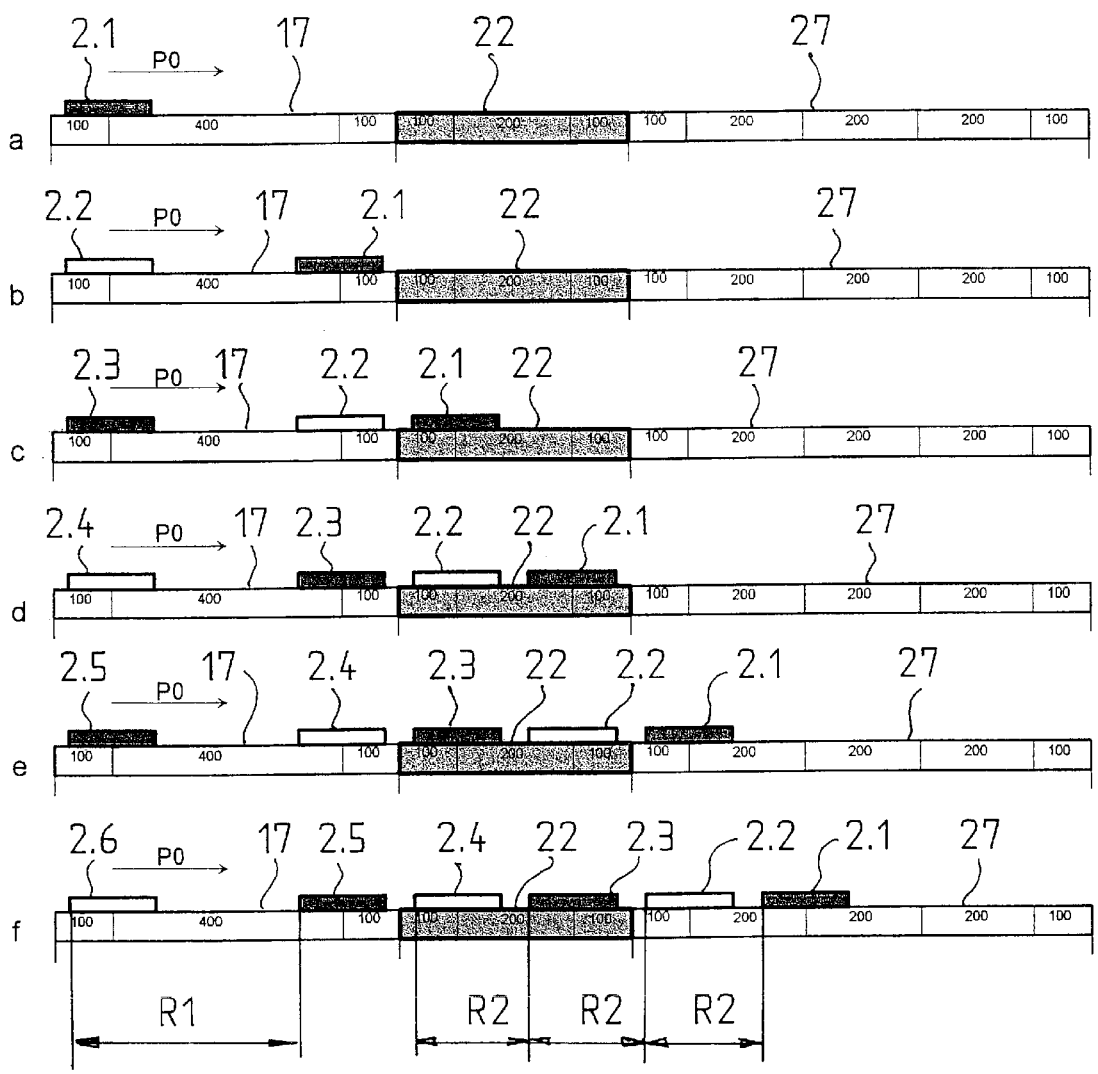
FIGS. 8a–f show schematic illustrations of the transfer of the workpiece carriers with different spacings within the production line.

FIGS. 8a–f show schematic illustrations of the transfer of the workpiece carriers 2 with different spacings within the production line 1. The distance statements again refer, by way of example, to millimeters. The workpiece carrier 2.1 of FIG. 8a stands in engagement with the first cogged belt 17, wherein the workpiece is processed by the work station 3.1. After the processing, the first drive motor 15 moves the first cogged belt 17 by 400 mm in production direction P0. Workpiece carrier 2.1 now stands at the position for processing of the workpiece by work station 3.2, and at the same time a further workpiece carrier 2.2 stands at the position for processing by work station 3.1 (FIG. 8b). In the next step (FIG. 8c) the first cogged belt 17 is moved by a further 400 mm and the second cogged belt 22 is moved by means of the second drive motor 20 by 200 mm, wherein the cogged belts 17, 22 are accelerated synchronously at the same speed. Workpiece carrier 2.1 is received by the second cogged belt 22 and stopped at the shown position. In the step of FIG. 8d the first cogged belt 17 is moved by a further 400 mm and the second cogged belt 22 by a further 200 mm, wherein the cogged belts 17, 22 are accelerated synchronously at the same speed. Two workpiece carriers 2.1, 2.2 are now arranged on the second cogged belt 22. In the step of FIG. 8e the first cogged belt 17 is moved by a further 400 mm, the second cogged belt 22 by a further 200 mm and the third cogged belt 27 by means of the third drive motor 25 by 200 mm, wherein the cogged belts 17, 22, 27 are accelerated synchronously at the same speed. In that case workpiece carrier 2.1 is received by the third cogged belt 27 and stopped at the shown position, at which position work station 4.1 processes the workpiece of workpiece carrier 2.1. In the step of FIG. 8f the transfer procedure is repeated in an analogous manner, wherein work station 4.2 processes the workpiece of workpiece carrier 2.1. The positions of the further workpiece carriers 2.2, 2.3, 2.4, 2.5, 2.6 have also been changed in an analogous manner. The mode of transfer shown in FIG. 8 is provided for work stations of the first group 3 with the pitch dimension R1 and for work stations of the second group 4 with the pitch dimension R2, wherein the work stations of the two groups 3, 4 execute equally time-intensive work procedures.

FIGS. 9a–h show schematic illustrations of the transfer of the workpiece carriers with different spacings and different time-intensive work procedures within the production line. The steps of FIG. 9a to FIG. 9d are identical with the steps of FIG. 8a to FIG. 8d. In the step of FIG. 9e the first cogged belt 17 remains stationary and the second cogged belt 22 and the third cogged belt 27 are moved by 400 mm, wherein the cogged belts 22, 27 are accelerated synchronously at the same speed. Workpiece carrier 2.1 and workpiece carrier 2.2 are received by the third cogged belt 27 and stopped at the shown position, at which position the work station 4.2 processes the workpiece of the workpiece carrier 2.1 and the work station 4.1 processes the workpiece of workpiece carrier 2.2. The work procedures are identical. The step of FIG. 9f is identical with the step of FIG. 9c. The step of FIG. 9g is identical with the step of FIG. 9d. In the step of FIG. 9h the step of FIG. 9e is repeated, wherein workpiece carrier 2.3 and the workpiece carrier 2.4 are received by the third cogged belt 27 and stopped at the shown position. With the movement of the third cogged belt 27 the workpiece carriers 2.1, 2.2 have also been moved on by 400 mm. Work station 4.2 processes the workpiece of the workpiece carrier 2.3 and work station 4.1 processes the workpiece of workpiece carrier 2.4. The work procedures are identical. Work station 4.3 processes the workpiece of workpiece carrier 2.2 and the work station 4.4 processes the workpiece of workpiece carrier 2.1. The work procedures are identical. The mode of transfer shown in FIG. 9 is provided for work stations of the first group 3 with the pitch dimension R1 and for work stations of the second group 4 with the pitch dimension R2, wherein the work stations of the second grid 4 execute work procedures which are twice as time intensive and wherein each two work stations execute the same work procedures at the same time. The cycle time of the less time-intensive work procedures of the first group 3 can thus be maintained for the entire production line 1.

In a further variant of embodiment the third drive motor 25 determines the pitch dimension within the third cogged belt 27.

We claim:

1. A method for the transfer of workpieces which are processed in at least one first group of work stations and in at least one second group of work stations of a production line, wherein a first transfer device moves workpiece carriers with the workpieces from work station to work station of the first group and a second transfer device moves workpiece carriers with the workpieces from work station to work station of the second group and wherein the first transfer device hands over the workpiece carriers to an interchange device and the interchange device feeds the workpiece carriers to the second transfer device, characterized in that the first and second transfer devices and the interchange device operate mechanically independently of one another, and are electrically synchronized with each other whereby a workpiece carrier is positively simultaneously engaged with the first transfer device and the interchange device during the handover therebetween and then positively simultaneously engaged with the interchange device and the second transfer device during the subsequent handover therebetween the workpiece carrier being capable of maintaining continuous travel during the transfer.

2. The method according to claim 1, characterized in that the speed of the interchange device is adjusted to serve as an adapter for a different workpiece spacing pitch dimensions between the first group and the second group.

3. Equipment for the transfer of workpieces by means of workpiece carriers within a production line with at least one first group of work stations and with at least one second group of work stations, comprising: a first transfer device in the form of first belt means for moving the workpiece carriers within the first group; a second transfer device in the form of second belt means for moving the workpiece carriers within the second group; and an interchange device in the form of third belt means between the first and second transfer devices for receiving the workpiece carriers from the first transfer device and feeding the workpiece carriers to the second transfer device; means for operating each of the first, second and third belt means mechanically independently of one another; and means for moving the workpiece carriers in a mechanically positively coupled manner upon each of the belt means whereby a workpiece carrier is positively simultaneously engaged with the first belt means and the third belt means during a handover therebetween and then positively simultaneously engaged with the third belt means and the second belt means during a subsequent handover therebetween and being capable of maintaining continuous travel during the transfer.

4. The equipment according to claim 3, wherein the means for moving the workpiece carriers in a mechanically positively coupled manner comprise double-sided cogged belts for the belt means and complementary toothed profile workpiece carriers.

5. The equipment according to claim 4 wherein the third belt means is located and positioned such that a toothed profile of a workpiece carrier simultaneously engages both the third belt means and one of the first and second belt means during a handover of the workpiece carrier to or from the interchange device.

6. The equipment according to claim 3, 4, or 5, further comprising first, second and third drive motors respectively coupled to the first, second and third belt means to each of the belt means to synchronize the belt means during a handover of a workpiece carrier therebetween.

\* \* \* \* \*